United States Patent
Zhang

(10) Patent No.: US 11,588,236 B2
(45) Date of Patent: Feb. 21, 2023

(54) VEHICLE-TO-INFRASTRUCTURE COMMUNICATION CONTROL INCLUDING NODE DEFICIENCY DETERMINATION

(71) Applicant: Ford Global Technologies, LLC, Dearborn, MI (US)

(72) Inventor: Linjun Zhang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 191 days.

(21) Appl. No.: 16/904,311

(22) Filed: Jun. 17, 2020

(65) Prior Publication Data
US 2021/0399415 A1    Dec. 23, 2021

(51) Int. Cl.
*H01Q 3/04* (2006.01)
*H04W 52/24* (2009.01)
(Continued)

(52) U.S. Cl.
CPC ................ *H01Q 3/04* (2013.01); *H04W 4/44* (2018.02); *H04W 16/28* (2013.01); *H04W 52/241* (2013.01)

(58) Field of Classification Search
CPC ..... H04W 40/20; H04W 4/024; H04W 4/025; H04W 4/026; H04W 4/027; H04W 4/40;
(Continued)

(56) References Cited

U.S. PATENT DOCUMENTS 7,215,925 B2 *   5/2007 Holloway ................ H04W 4/06
                                                                455/344
10,469,619 B2   11/2019 Shimizu et al.
(Continued)

FOREIGN PATENT DOCUMENTS

WO    2017066912 A1    4/2017
WO    2017133501 A1    8/2017

OTHER PUBLICATIONS

Non-Final Office Action dated Feb. 25, 2022; U.S. Appl. No. 16/904,284, filed Jun. 17, 2020.
(Continued)

*Primary Examiner* — Lewis G West
(74) *Attorney, Agent, or Firm* — Frank A. MacKenzie; Bejin Bieneman PLC

(57) ABSTRACT

A system comprises an infrastructure element including a computer programmed to communicate with a first stationary communication node having a first directional short-wave antenna with a first field of view and a second stationary communication node having a second directional short-wave antenna with a second field of view. The first communication node is located within the second field of view. The computer is programmed to determine a first and a second transmission parameter for the first and second stationary communication node respectively based on received object detection sensor data including object data from a respective field of view of each communication node's directional antenna. Each of the first and second transmission parameters includes a transmission power and/or a data throughput rate. The computer is programmed, based on received communication metrics from the first communication node, to determine a deficiency of the second communication node, and upon determining the deficiency of the second communication node, to actuate the first communication node to provide coverage for the second field of view.

18 Claims, 7 Drawing Sheets

(51) Int. Cl.
*H04W 16/28* (2009.01)
*H04W 4/44* (2018.01)

(58) Field of Classification Search
CPC ........... H04W 4/42; H04W 4/44; H04W 4/46; H04W 40/244; H04W 72/046; H04W 40/26; H04W 24/02; H04W 24/04; H04B 7/0695; H04B 7/0617; H04B 7/0619; H04B 7/088; H04B 7/024; H01Q 3/00
See application file for complete search history.

(56) References Cited

U.S. PATENT DOCUMENTS

| | | | | |
|---|---|---|---|---|
| 2007/0087695 | A1* | 4/2007 | Cohen | H04W 40/18 |
| | | | | 455/63.4 |
| 2015/0194039 | A1* | 7/2015 | Martin | H04L 69/08 |
| | | | | 340/632 |
| 2017/0325179 | A1 | 11/2017 | Ameixieira | |
| 2018/0013655 | A1 | 1/2018 | Ameixieira | |
| 2018/0144623 | A1 | 5/2018 | Shirakata et al. | |
| 2018/0242115 | A1 | 8/2018 | Kim et al. | |
| 2018/0343605 | A1* | 11/2018 | Wu | H04W 8/005 |
| 2019/0028862 | A1 | 1/2019 | Futaki | |
| 2019/0132709 | A1 | 5/2019 | Graefe et al. | |
| 2019/0287396 | A1 | 9/2019 | Sayin et al. | |
| 2020/0280827 | A1 | 9/2020 | Fechtel et al. | |
| 2021/0400500 | A1* | 12/2021 | Zhang | H04W 4/02 |
| 2022/0103988 | A1* | 3/2022 | Zhang | H04W 40/20 |

OTHER PUBLICATIONS

Weingart, "Standardisation of SPaT and Map", Amsterdam INTERTRAFFIC 2014, Swarco (19 pages).

* cited by examiner

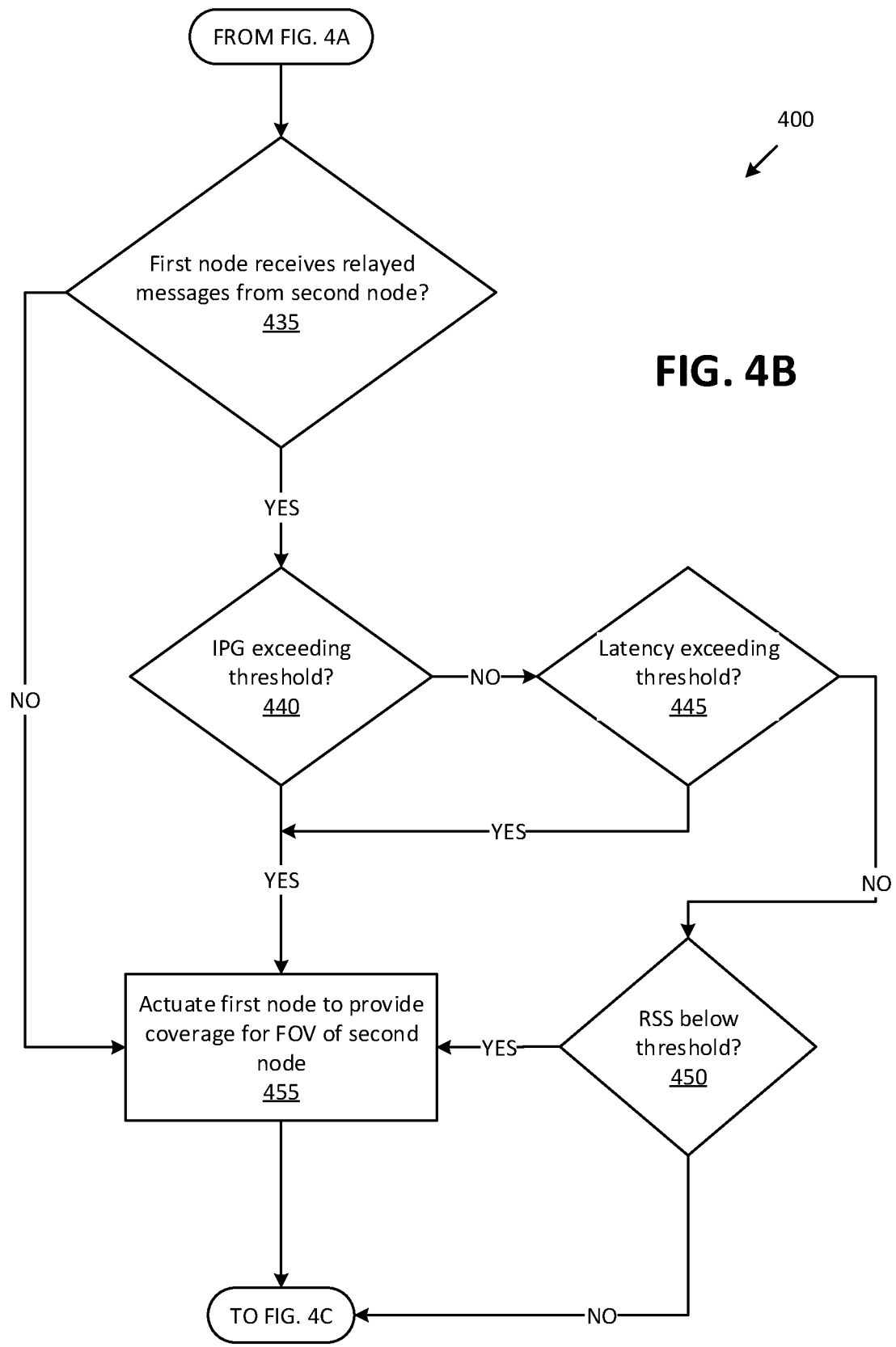

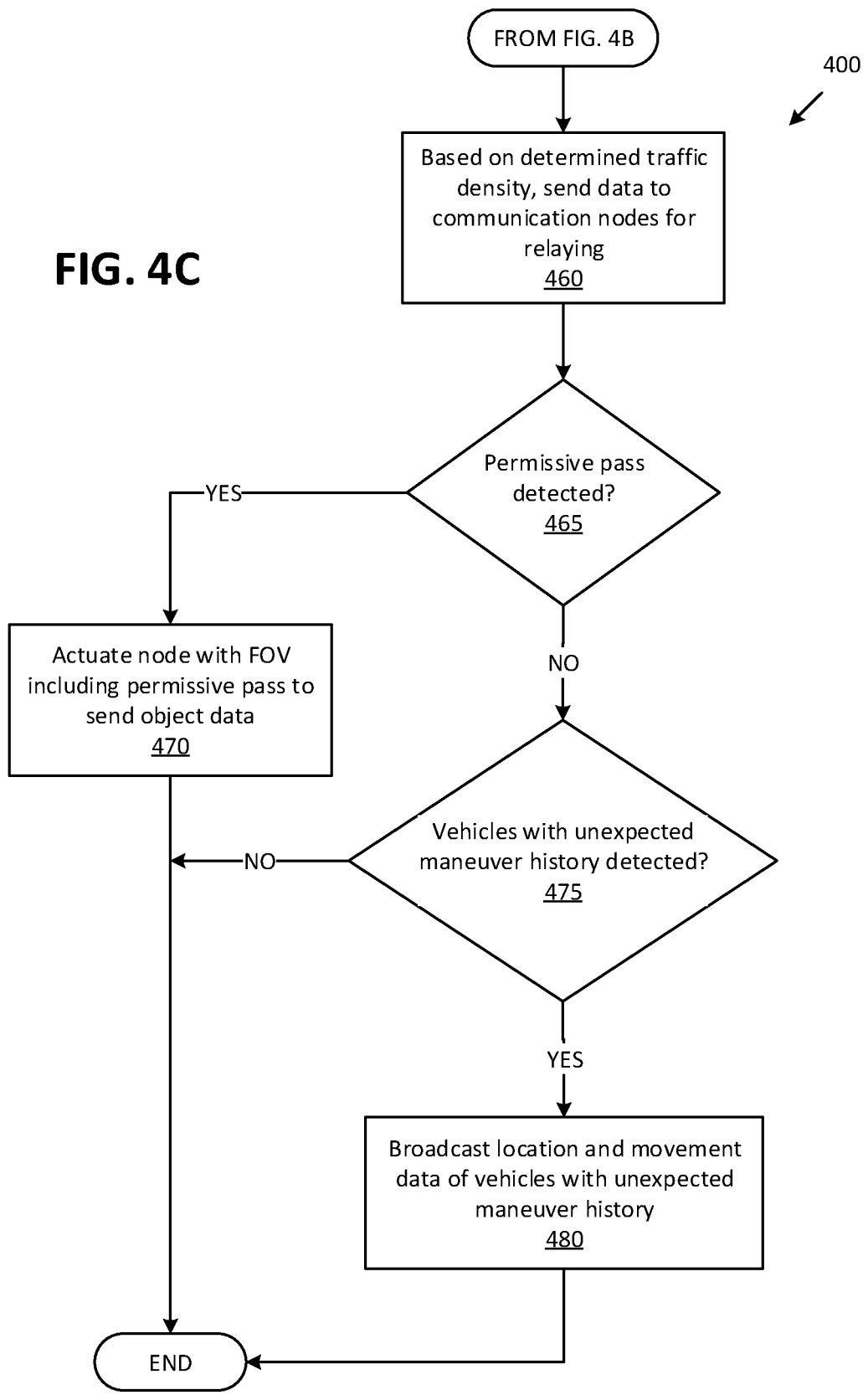

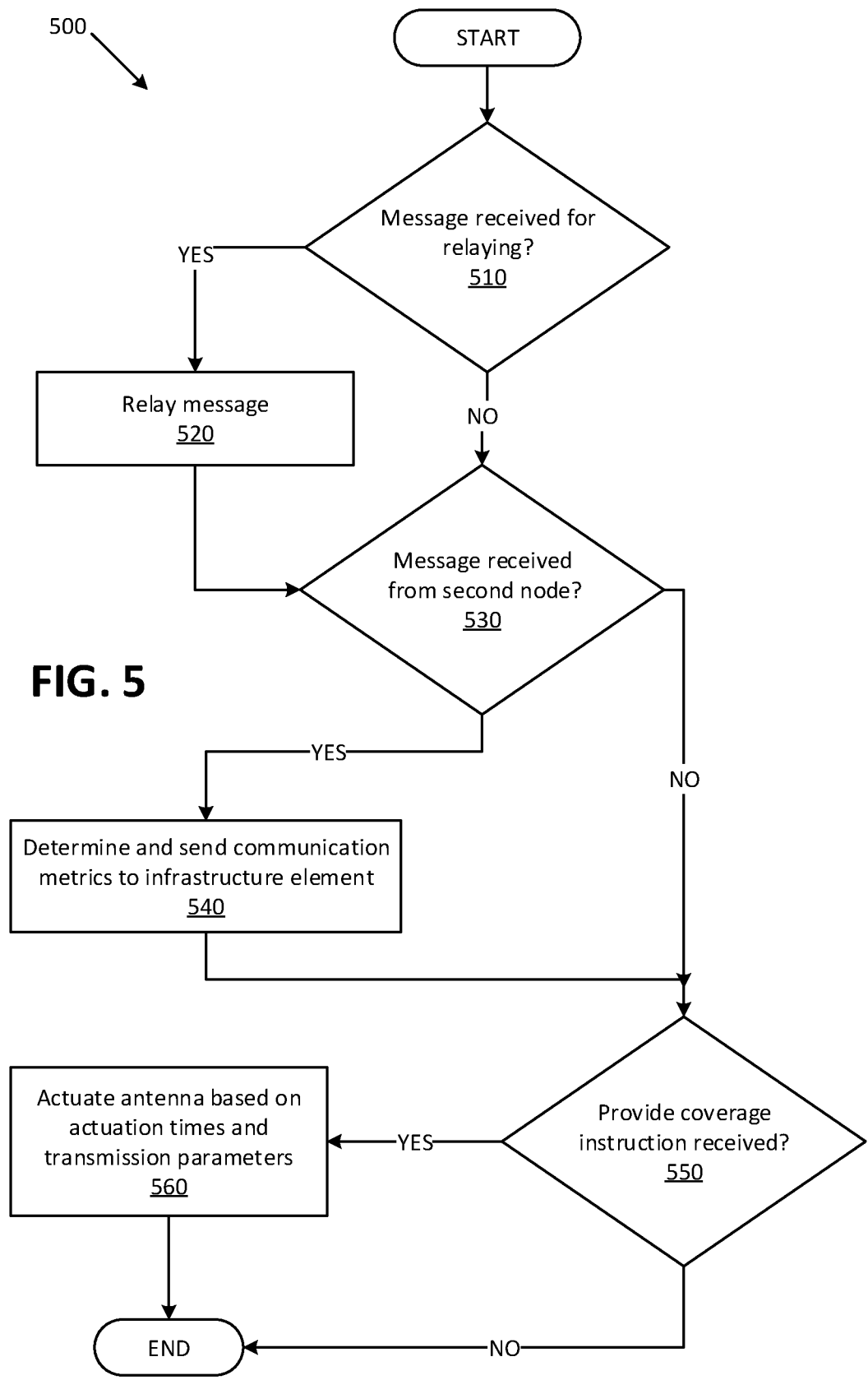

VEHICLE-TO-INFRASTRUCTURE COMMUNICATION CONTROL INCLUDING NODE DEFICIENCY DETERMINATION

BACKGROUND

A vehicle can receive messages, e.g., from a stationary infrastructure element, via one or more wireless communication networks and/or protocols, e.g., providing what can be referred to as V2X communications (vehicle-to-everything communications which can include vehicle-to-vehicle and vehicle-to-infrastructure communications). Data shared via V2X communications from the infrastructure element can include data about a weather condition, traffic condition, an ongoing roadside assistance, etc. However, if infrastructure components such as computer(s) or antenna(s), etc., are impaired, data may not be relayed with an acceptable level of quality.

BRIEF DESCRIPTION OF THE DRAWINGS

FIGS. 4A-4C is a flowchart of an exemplary process for operating the infrastructure element.

FIG. 5 is a flowchart of an exemplary process for operating stationary communication nodes.

DETAILED DESCRIPTION

Introduction

Figure 1:
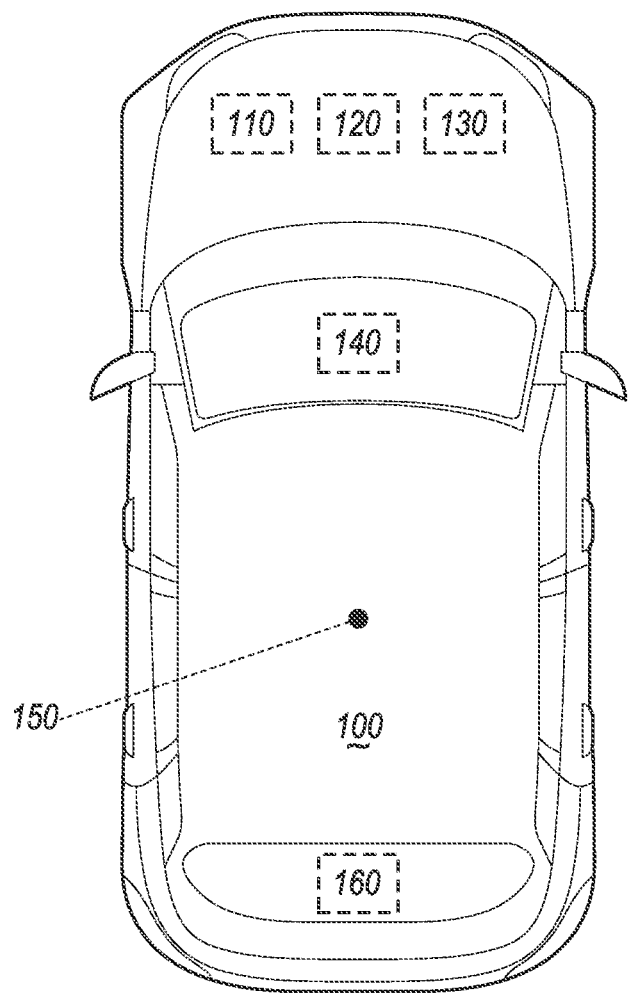
FIG. 1 is a diagram illustrating an example vehicle.

Disclosed herein is a system comprising an infrastructure element including a computer. The computer is programmed to communicate with a first stationary communication node having a first directional short-wave antenna with a first field of view and a second stationary communication node having a second directional short-wave antenna with a second field of view, wherein the first communication node is located within the second field of view, to determine a first transmission parameter for the first stationary communication node and a second transmission parameter for the second stationary communication node based on received object detection sensor data including object data from a respective field of view of each communication node's directional antenna, wherein each of the first and second transmission parameters includes at least one of a transmission power or a data throughput rate, based on received communication metrics from the first communication node, to determine a deficiency of the second communication node, upon determining the deficiency of the second communication node, to actuate the first communication node to provide coverage for the second field of view.

The computer may be further programmed to provide coverage for the second field of view by actuating an actuator of the first communication node to rotate the first directional antenna, thereby providing a third field of view including the first and second fields of view.

The computer may be further programmed to determine a rotational speed of the first directional antenna based on the first and second transmission parameters.

The computer may be further programmed to reduce the transmission data throughput rate based on a rotational speed of the first directional antenna.

The computer may be further programmed to adjust the first transmission parameter based on a traffic density within the first field of view.

The computer may be further programmed to adjust the first transmission parameter based on a status of a traffic light within the first field of view.

The computer may be further programmed to determine that the second communication node is deficient based on data received from a second computer including a vehicle computer within the first field of view, thereby determining that the first stationary communication node is operational.

The computer may be further programmed to determine that the second communication node is deficient by transmitting data from the computer to the second stationary communication node for transmitting within the second field of view, receiving the communication metrics from the first stationary communication node including whether the transmitted data was received at the first communication node, and then determining that the second communication node is deficient based on the received communication metrics.

The computer may be further programmed to determine one or more actuation times for transmitting messages of the deficient second communication node from the first stationary communication node based on (i) a field of view of the second communication node, (ii) a viewing angle of an antenna of the first communication node, (iii) a location of the road, (v) a rotational speed of the antenna of the first stationary communication antenna, and (v) a location of the first stationary communication node, and actuate the first stationary communication node to transmit messages of the second stationary communication node at the determined one or more actuation times.

Further disclosed herein is a method, comprising communicating with a first stationary communication node having a first directional short-wave antenna with a first field of view and a second stationary communication node having a second directional short-wave antenna with a second field of view, wherein the first communication node is located within the second field of view, determining a first transmission parameter for the first stationary communication node and a second transmission parameter for the second stationary communication node based on received object detection sensor data including object data from a respective field of view of each communication node's directional antenna, wherein each of the first and second transmission parameters includes at least one of a transmission power or a data throughput rate, based on received communication metrics from the first communication node, determining a deficiency of the second communication node, and upon determining the deficiency of the second communication node, actuating the first communication node to provide coverage for the second field of view.

The method may further include providing coverage for the second field of view by actuating an actuator of the first communication node to rotate the first directional antenna, thereby providing a third field of view including the first and second fields of view.

The method may further include determining a rotational speed of the first directional antenna based on the first and second transmission parameters.

The method may further include reducing the transmission data throughput rate based on a rotational speed of the first directional antenna.

The method may further include adjusting the first transmission parameter based on a traffic density within the first field of view.

The method may further include adjusting the first transmission parameter based on a status of a traffic light within the first field of view.

The method may further include determining that the second communication node is deficient based on data received from a second computer including a vehicle computer within the first field of view, thereby determining that the first stationary communication node is operational.

The method may further include determining that the second communication node is deficient by transmitting data from the computer to the second stationary communication node for transmitting within the second field of view, receiving the communication metrics from the first stationary communication node including whether the transmitted data was received at the first communication node, and then determining that the second communication node is deficient based on the received communication metrics.

The method may further include determining one or more actuation times for transmitting messages of the deficient second communication node from the first stationary communication node based on (i) a field of view of the second communication node, (ii) a viewing angle of an antenna of the first communication node, (iii) a location of the road, (v) a rotational speed of the antenna of the first stationary communication antenna, and (v) a location of the first stationary communication node, and actuating the first stationary communication node to transmit messages of the second stationary communication node at the determined one or more actuation times.

Further disclosed is a computing device programmed to execute any of the above method steps.

Yet further disclosed is a computer program product, comprising a computer-readable medium storing instructions executable by a computer processor, to execute any of the above method steps.

Exemplary System Elements

An infrastructure element can broadcast messages via wireless communication networks and/or protocols, e.g., vehicle-to-everything (V2X) communications, within an infrastructure element coverage area, e.g., within a range of a radio frequency (RF) transmitter, e.g., 1000 meters (m) from the infrastructure element location. In order to ensure a reception quality of messages within the coverage area of the infrastructure element, multiple stationary communication nodes may be installed which relay the messages via a communication node antenna, e.g., a directional antenna. In the present context, "reception quality" means one or more transmission quality measures such as signal strength, packet error rate, channel busy ratio, inter-packet gap, etc., determined at a receiver such as a vehicle or a stationary communication node within the coverage area.

The reception quality of messages can be improved by relaying messages by stationary communication nodes within the coverage area of the infrastructure element. However, a stationary communication node may become deficient and thus may fully or partially fail to relay messages. A node "deficiency," in the present context, is a condition in which, e.g., a communication node, (i) does not send out messages when actuated to do so and/or (ii) transmitted messages fail to meet one or more specified measurement thresholds such as specified data rate, a specified signal power, etc. To detect and remediate for a deficient communication node, a computer can be programmed to communicate with a first stationary communication node having a first directional short-wave antenna with a first field of view and a second stationary communication node having a second directional short-wave antenna with a second field of view. The first communication node is located within the second field of view. The computer can be programmed to determine a first transmission parameter for the first stationary communication node and a second transmission parameter for the second stationary communication node based on received object detection sensor data including object data from a respective field of view of each communication node's directional antenna. Each of the first and second transmission parameters may include a transmission power or a data throughput rate. The computer may then determine a deficiency (e.g., failure to relay messages) of the second communication node based on received communication metrics from the first communication node. Upon determining the deficiency of the second communication node, the computer may actuate the first communication node to provide coverage for the second field of view, e.g., by rotating the first directional short-wave antenna.

FIG. 1 illustrates a vehicle 100 which may be powered in a variety of ways, e.g., with an electric motor and/or internal combustion engine. The vehicle 100 may be a land vehicle such as a car, truck, etc. Additionally or alternatively, a vehicle 100 may be a drone, a robot, etc. Additionally or alternatively, the vehicle 100 may include a bicycle, a motorcycle, etc. A vehicle 100 may include a computer 110, actuator(s) 120, sensor(s) 130, and a Human Machine Interface (HMI 140), and a wireless communication interface 160. A reference point such as a geometrical center point 150 can be specified for a vehicle 100, e.g., a point at which respective longitudinal and lateral centerlines of the vehicle 100 intersect.

The computer 110 includes a processor and a memory such as are known. The memory includes one or more forms of computer-readable media, and stores instructions executable by the computer 110 for performing various operations, including as disclosed herein.

The computer 110 may operate the respective vehicle 100 in an autonomous, a semi-autonomous mode, or a non-autonomous (or manual) mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode a human operator controls each of vehicle 100 propulsion, braking, and steering.

The computer 110 may include programming to operate one or more of vehicle 100 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Additionally or alternatively, in cases where the computer 110 actually comprises a plurality of devices, the vehicle 100 communication network may be used for communications between devices represented as the computer 110 in this disclosure. Further, as mentioned below, various controllers and/or sensors may provide data to the computer 110 via the vehicle communication network.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of a vehicle 100.

The sensors 130 may include a variety of devices such as are known to provide data to the computer 110. For example, the sensors 130 may include Light Detection And Ranging (LIDAR) sensor(s) 130, etc., disposed on a top of the vehicle 100, behind a vehicle 100 front windshield, around the vehicle 100, etc., that provide relative locations, sizes, and shapes of objects surrounding the vehicle 100. As another example, one or more radar sensors 130 fixed to vehicle 100 bumpers may provide data to provide locations of the objects, second vehicles 100, etc., relative to the location of the vehicle 100. The sensors 130 may further alternatively or additionally include camera sensor(s) 130, e.g. front view, side view, etc., providing images from an area surrounding the vehicle 100.

The vehicle 100 may determine a location, e.g., GPS (Global Positioning System) location coordinates, of the vehicle 100 relative to a coordinate system 270, e.g., based on data received from a vehicle 100 GPS (Global Positioning System) sensor 130. Additionally, the computer 110 may be programmed to determine a direction of the vehicle 100 movement, e.g., based on data received from the GPS sensor 130. The vehicle 100 computer 110 may be programmed to determine a vehicle 100 location and/or direction movement with respect to a coordinate system, e.g., a Cartesian coordinates system 270, based on data received from the vehicle 100 GPS sensor 130. The computer 110 may be programmed to broadcast the vehicle 100 location and/or direction of movement via a V2X to other vehicles 100 and/or an infrastructure element 210.

The HMI 140 may be configured to receive input from a human operator during operation of the vehicle 100. Moreover, an HMI 140 may be configured to display, e.g., via visual and/or audio output, information to the user. Thus, an HMI 140 may be located in the passenger compartment of the vehicle 100 and may include one or more mechanisms for user input.

Figure 2:
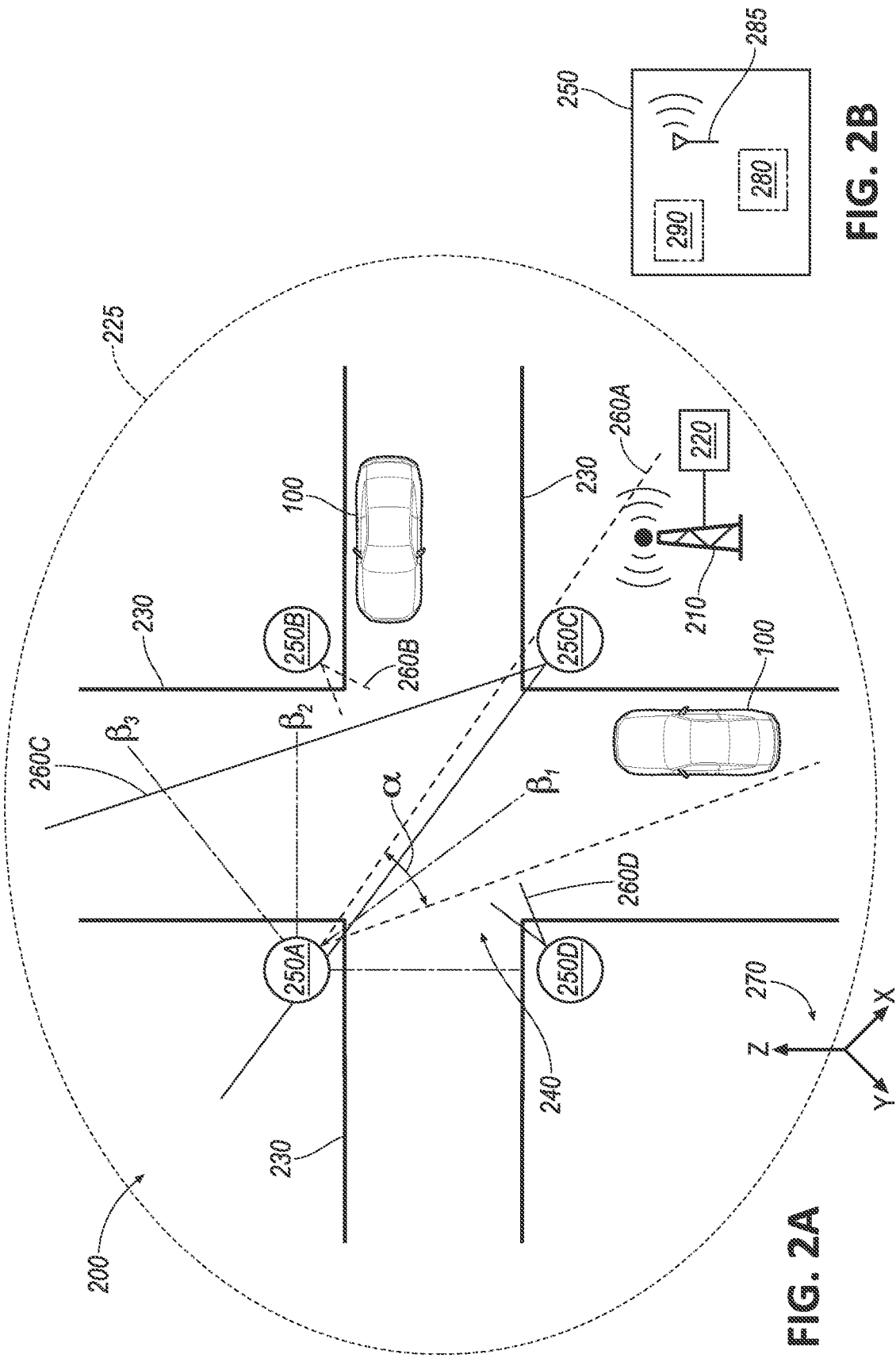
FIG. 2A is a diagram showing an infrastructure element and stationary communication nodes within a coverage area of the infrastructure element.
FIG. 2B is a diagram showing example elements of a stationary communication node.

The computer 110 may be configured for communicating through a wireless communication interface 160 with other vehicles 100, e.g., via a vehicle-to-vehicle (V2V), a vehicle-to-infrastructure (V-to-I) communication, and/or a vehicle-to-everything (V2X) communication network (i.e., communications that can include V2V and V2I). The communication interface 160 may include elements for sending (i.e., transmitting) and receiving radio frequency (RF) communications, e.g., chips, antenna(s), transceiver(s), etc. The communication interface 160 represents one or more mechanisms by which vehicle 100 computers 110 may communicate with other vehicles 100 and/or infrastructure element(s) 210 (see FIG. 2), and may be one or more of wireless communication mechanisms, including any desired combination of wireless and wired communication mechanisms and any desired network topology (or topologies when a plurality of communication mechanisms are utilized). Exemplary V2X communication protocols include cellular, IEEE 802.11, dedicated short-range communications (DSRC), and/or wide area networks (WAN), including the Internet, providing data communication services. DSRC may have one-way or two-way short-range to medium-range wireless communication channels. A V2X communication network may have multiple channels, each identified by an identifier, e.g., channel number.

FIG. 2A illustrates a system 200 including a plurality of vehicles 100 and an infrastructure element 210 including a computer 220, roads(s) 230 with intersection(s) 240, and a plurality of stationary communication nodes 250, in a coverage area 225. Although only one intersection 240 is shown, in fact, one or more intersections 240 may be located within the coverage area 225. Various types of environmental features such as vegetation, buildings, hills, etc., may be located within the coverage area 225. Although only one infrastructure element 210 is shown, multiple infrastructure elements 210 may be installed within a region and may have overlapping coverage areas 225, as discussed further below.

The infrastructure computer 220 includes a processor and a memory such as are known. The memory includes one or more forms of computer-readable media, and stores instructions executable by the computer 220 for performing various operations, including as disclosed herein. The computer 220 may be configured for communicating through one or more infrastructure elements 210 with vehicles 100 via a V2X communication protocol, e.g., DSRC or the like.

An infrastructure element 210 may include chips, antenna(s), transceiver(s), etc. The infrastructure element 210 may have a specified communication coverage area (or area 225). A coverage area 225, in the present context, is an area in which the infrastructure 210 can communicate with another computer, e.g., a vehicle 100 computer 110, a stationary communication node 250A, 250B, 250C, 250D, a mobile device of a pedestrian, etc. Dimensions and/or a shape of area 225 are typically based on a communication technique, communication frequency, communication power, etc., of the infrastructure element 210 as well as environmental features (i.e., an arrangement of natural and artificial physical features of an area), a topography (i.e., changes in elevation), etc., of the area 225, etc. In one example, an area 225 is circular and surrounds a location of the infrastructure element 210 with a diameter of 1000 meters (m). In another example (not shown), an area 225 may be rectangular and centered at the location of the infrastructure element 210 with a side length of 2000 m. A location and dimensions of a coverage area 225 may be specified with respect to a coordinate system, e.g., a Cartesian coordinate system 270. In a Cartesian coordinate system 270, coordinates of points may be specified by X, Y, and Z coordinates. X and Y coordinates, i.e., horizontal coordinates, may be global positioning system (GPS) coordinates (i.e., lateral and longitudinal coordinates) or the like, whereas a Z coordinate may specify a vertical component to a location, i.e., a height (or elevation) of a point from a specified horizontal plane, e.g., a sea level.

The infrastructure element 210 can be placed, typically permanently fixed, at a location in area 225, e.g., mounted to a stationary object such as a pole, post, road overpass, sign, etc. As shown in FIG. 2A, multiple vehicles 100 on the road(s) 230 may be within the coverage area 225 of the infrastructure element 210. Road(s) 230 may be two-way (as shown in FIG. 2A) or one-way. Roads 230 may have one or more lanes in each direction.

The infrastructure element computer 220 may be programmed to transmit, via the wireless network V2X, messages including data such as weather data, road condition, etc. Table 1 below shows an example set of data included in a message transmitted by an infrastructure element 210. A message typically includes a header and a payload. A header may include a timestamp specifying a time of sending the message, a message source identifier, and a sequential counter. The payload may include SPAT (Signal Phase and Timing) data for a traffic signal, map data (i.e., describing roads and possibly also landmarks such as bridges, buildings, etc., including describing lanes in and/or around an intersection, lanes in a road section, types of road, restrictions of lanes, etc.), road users detected by the infrastructure, and/or other data.

A timestamp specifies a time of generation and/or transmission of a message. The timestamp may be determined based on a local clock in the computer 220, and/or based on clock data received from a remote computer such as a time reference clock for the GPS (General Positioning System), etc.

A sequential counter is a number, typically an integer, that, upon sending each message, increases by a specified number, e.g., typically one, while counting from a start number, e.g., 0 (zero). In current examples a sequential counter may count to an end number, e.g., 100, and then reset to the start number. A sequential counter allows a receiver of messages to determine whether one or more messages were or were not received. For example, a receiver may determine upon receiving a message that a previous message was not received, e.g., when a message includes a counter value of 12, and a last received message counter value was 10. In other words, based on a specified increase step of 1 (one) known to the receiver, the receiver determines that a message with a message counter of 11 was not received.

A source identifier identifies the source of a message. Thus, a receiver may recognize whether a message was received from an infrastructure element 210, a vehicle 100, etc., based on a source identifier included in a received message.

TABLE 1

| Message section | Datum | Description |
| --- | --- | --- |
| Header | Timestamp | A time of generating and/or transmitting. |
| | Sequence Number | A sequentially increasing and resetting number, e.g., zero to 100. |
| | Source | An identifier of message source, e.g., an infrastructure element identifier. |
| Payload | SPaT (Signal Phase and Timing) | Permission linked to maneuvers of vehicle, e.g., at an intersection. |
| Payload | MAP | Topological definition of road lanes (e.g., location coordinates), type of lanes (e.g., road, freeway, etc.), links between lanes (e.g., bridges, intersections, etc.), restrictions at lanes (e.g., "DO NOT PASS" restriction, speed limit, etc.) |
| Payload | Infrastructure object detections | States of the road users around the infrastructure, which include position, heading, velocity, etc. |

The computer 220 can be programmed to receive one or more communication metrics and node identification data including node location data, from each of multiple stationary communication nodes 250A, 250B, 250C, 250D with directional short-wave antenna 285 in a coverage area 225. Node identification data, in the present context, specify (i) a location of the node 250, e.g., GPS location coordinates, (ii) an identifier of a node, e.g., a combination of number and letters, etc., and (iii) a location of a field of view 260A, 260B, 260C, 260D (as discussed below).

A transmission parameter of a communication node 250A, 250B, 250C, 250D is a parameter (i.e., numerical value) that governs transmission of data from a stationary communication node 250A, 250B, 250C, 250D, such as a transmission power P, a data throughput rate R, or the like. A transmission power P represents an amount of electromagnetic power, e.g., specified in decibel-milliwatts (dBm). As discussed further below, the computer 220 may actuate a communication interface of the infrastructure element 210 to radiate the power P for transmitting the V2X messages. A data throughput rate R represents a rate of transmission of a V2X message, e.g., specified in message per second (msg/sec), Hertz (Hz), etc. As discussed further below, the computer 220 may actuate a communication interface of the infrastructure element 210 to adjust a data throughput rate R of the infrastructure element 210.

A transmission parameter such as a data throughput rate R may be determined (e.g., by a computer 220) based on a traffic density within a field of view 260A, 260B, 260C, 260D of a communication node 250A, 250B, 250C, 250D. For example, the computer 220 may be programmed to determine a first transmission parameter of the node 250A based on a traffic density within the first field of view 260A. A traffic density, in the present context, is a number of vehicles per a unit length of a road 230, e.g., specified with a number of vehicles per kilometer (veh/km). The computer 220 may determine a traffic density of a road section, e.g., a section within the field of view 260A, based on data received from a camera sensor mounted to a pole monitoring the road 230, data received via V2X communication network including location coordinates and/or direction of movement of the vehicles 100, etc. In one example, the computer 220 may determine the data throughput rate R (or data rate R) for a field of view 260A based on one or more traffic density thresholds $D_t$. For example, the computer 220 may be programmed to determine a first data throughput rate R of 10 Hz upon determining a traffic density less than a density threshold $D_t$ of 15 veh/km and a second data throughput rate R of 1 Hz upon determining a traffic density D equal to or exceeding the density threshold $D_t$ of 15 veh/km.

As shown in FIG. 2A, fields of view 260A, 260B, 260C, 260D cover different, but not necessarily mutually exclusive, portions of roads 230. Thus, a traffic density D within one field of view 260 may be different compared to a traffic density D within another field of view 260. The computer 220 can be programmed to determine a first transmission parameter, e.g., power $P_1$, data rate $R_1$, etc., for the first stationary communication node 250A, and a second transmission parameter, e.g., power $P_2$, data rate $R_2$, etc., for the second stationary communication node 250C based on received object detection sensor data including object data from a respective field of view 260A, 260C of each communication node's 250A, 250D directional antenna 285. Each of the first and second transmission parameters may include a transmission power or a data throughput rate. For example, the computer 220 may be programmed to determine the first and second transmission parameters based on determined traffic densities in each of the fields of view 260A, 260C. For example, as discussed above, the computer 220 may be programmed to determine a data rate R based on the traffic density and a density threshold $R_t$.

In the present context, a communication metric is a quantitative measurement of a received wireless communication, e.g., of a message or messages sent by a stationary communication node 250A, 250B, 250C, 250D and received at a location within a coverage area 225 of the respective coverage area 225, e.g., by a communication node 250A, 250B, 250C, 250D. A communication metric can be, for example, a received signal strength RSS, a packet error rate PER, a channel busy ratio CBR, and/or an inter-packet gap IPG. Thus, a transmission parameter governs how a message is transmitted, e.g., data rate R, power P, etc., whereas a communication metric specifies a quality of the transmitted message is received at a receiver, e.g., how many of messages were missed, whether the received signal is too weak, etc.

A received signal strength RSS specifies a received signal power, e.g., specified in dBm. A packet error rate PER specifies a percentage of messages that are dropped and/or cannot be correctly decoded. An inter-packet gap IPG specifies a time interval between two consecutive messages received from an infrastructure element 210, e.g., measured in milliseconds (ms).

A communication node 250A, 250B, 250C, 250D (collectively, nodes 250) is an electronic repeater that measures communication metrics of received wireless messages and if warranted, based on the measured communication metrics, then repeats the received messages. Regarding FIG. 2B, a communication node 250 includes an antenna 285 for V2X communications, an actuator 290, and a computer 280 including a memory and a processor programmed to communicate with the infrastructure element(s) 210 via the V2X communications. Additionally, a communication node 250 may communicate with an infrastructure computer 220 via a wired and/or wireless communication network. The communication node 250 can receive messages from one or more infrastructure elements 210 and further broadcast messages.

Additionally or alternatively, a communication node 250 may include a dedicated electronic circuit including an ASIC that is manufactured for a particular operation, e.g., an ASIC for measuring communication metrics and/or relaying the messages. In another example, a communication node 250 may include an FPGA which is an integrated circuit manufactured to be configurable by a customer. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included inside a chip packaging.

The antenna 285 is typically a directional short-wave antenna 285 for broadcasting messages via the V2X communication network and may transmit radio waves with wavelengths from 1 to 10 millimeters (mm). The antenna 285 may therefore be referred to as a short-wave or millimeter wave (mmWave or mmW) antenna 285. A coverage area of each communication node 250A, 250B, 250C, 250D is an area on the ground surface in which a receiver such as another communication node 250A, 250, 250C, 250D would receive transmitted messages. The coverage area of a communication node 250A, 250B, 250C, 250D with a directional antenna 285 is herein referred to as a field of view 260A, 260B, 260C, 260D. For example, the fields of view 260A, 260B, 260C, 260D may have a triangular shape, as shown in FIG. 2A. A field of view 260A, 260B, 260C, 260D may be specified by (i) an angle of the directional antenna 285 axis on the ground surface relative to a reference line $L_r$, e.g., an angle between node 250A antenna 285 axis $at_1$ and the reference line $L_r$, and (ii) a viewing angle α (or width angle α) of the field of view 260A. The axis $at_1$ is an imaginary line in a direction of maximum signal strength for the directional antenna 285. The viewing angle α, e.g., 30 degrees, specifies an angular area of a radiation pattern of the directional antenna 285. Conventional techniques can be used to determine a radiation pattern of an antenna 285. The viewing angle α may be based on shape, type, and/or operating frequency of the antenna 285.

A communication node 250A, 250B, 250C, 250D may include an actuator 290, e.g., an electric motor, to change a field of view 260A, 260B, 260C, 260D. For example, as discussed further below, a motor actuator 290 may rotate an antenna 285 to provide coverage to the fields of view 260A, 260C. A change of a field of view 260A, 260B, 260C, 260D means rotating an axis, e.g., axis $at_1$, of the antenna 285 about a location of the respective node 250A, while a viewing angle of the antenna 285 does not change. Thus, an area on the ground surface covered by the node 250A antenna 285 may change while a viewing angle of the field of view 260A does not change relative to the antenna 285 axis although the angular shaped area on the ground surface changes as the antenna 285 rotates, as discussed below with respect to angles of transmission $\beta_1$, $\beta_2$, $\beta_3$.

Multiple communication nodes 250 are typically located within the coverage area 225 of the infrastructure element 210. Additionally or alternatively, coverage areas 225 of two or more infrastructure elements 210 may overlap. A communication node 250 within each of two or more areas 225 that overlap may thus communicate with multiple infrastructure elements 210.

In the present context, relaying by a communication node 250 means that the communication node 250 resends the message which was received from an infrastructure element 210. Typically, a relayed message has a same data payload or content as an original message.

A communication node 250 may include a location sensor, e.g., a GPS sensor, and the computer 280 may be programmed to determine location coordinates of the communication node 250 relative to the coordinate system 270 based on data received from the location sensor. Additionally or alternatively, because the communication node 250 is stationary, the location coordinates of the communication node 250 may be stored in a computer 280 memory, e.g., upon installation of the node 250 at a location, e.g., to a pole, guardrail, overhead gantry, bridge body, etc.

The infrastructure computer 220 can be programmed to communicate with the stationary communication nodes 250A, 250B, 250C, 250D having field(s) of view 260A, 260B, 260C, 260D. However, a communication node 250A, 250B, 250C, 250D may be deficient. In one example, a computer, e.g., the infrastructure computer 220, a communication node 250A computer 280, etc., may be programmed to detect, e.g., a deficient communication node 250C, and actuate, e.g., the communication node 250A, to provide coverage for an area that should be covered by the deficient node 250C field of view 260C in addition to the respective field of view 260A.

As shown in FIG. 2A, the first communication node 250A can be located within the second field of view 260C. Thus, the first communication node 250A should receive a message sent by the second communication node 250C within the field of view 260C. Therefore, based on communication metrics of the first communication node 250A, it may be determined, as discussed below, whether there is a deficiency at the second communication node 250C. As discussed above, a node 250 "deficiency," in the present context, is a condition in which, e.g., a communication node 250C, (i) does not send out messages and/or (ii) transmitted messages fail to meet specified criteria such as specified data rate R, a specified signal power P, etc. For example, a communication node 250C may be determined to be deficient when a transmission parameter, e.g., data throughput rate R, etc., of messages relayed by the communication node 250C deviates from a specified rate $R_s$ by at least a predetermined deviation threshold of, e.g., 10%.

As discussed above, the communication node 250A can be located in the field of view 260C of the communication node 250C and vice versa. Further, any number of communication nodes 250 may be located in the area 225 and any number of the nodes 250 may be within a field of view 260 of another node 250. A node 250 represents any of nodes 250A, 250B, 250C, 250D. A field of view 260 represents any of the fields of view 260A, 260B, 260C, 260D.

The computer 220 may be programmed to determine that a first communication node 250A is within a second communication node 250C field of view 260C based on object detection data, e.g., camera sensor data including a location of the communication node 250A and/or data stored in the computer 220 including the location of the field of view 260C. Additionally or alternatively, the computer 220 may be programmed to determine a location of the communication node 250A based on location coordinates of the node 250A, relative to the coordinates system 270, stored in a computer 220 memory or received from the node 250A computer 280. Thus, upon determining that the node 250A is within the field of view 260C, the computer 220 may select the first communication node 250A for determining, based on data received from the first node 250A, whether the second node 250C is deficient.

The computer 220 may determine a deficiency of the second communication node 250B based on received communication metrics from the first communication node 250A. Upon determining the deficiency of the second communication node 250B, the computer 220 may actuate the first communication node 250A to provide coverage for the second field of view 260B.

The computer 220 may be programmed to determine that the second communication node 250B is deficient by transmitting data from the computer 220 to the second stationary communication node 250C, e.g., via a wired or wireless communication network, for transmitting within the second field of view 260C and receiving the communication metrics from the first stationary communication node 250A including whether the transmitted data was received at the first communication node 250A. The computer 220 may then determine that the second communication node 250B is deficient based on the received communication metrics. For example, the computer 220 may be programmed to actuate the second communication node 250C to transmit a message with a data rate R of 100 ms (millisecond). The computer 220 may be programmed to receive communication metrics from the communication node 250A within the field of view 260C and verify based on the received communication metrics whether the communication node 250C is deficient.

A communication node 250 computer may be programmed to determine an inter-packet gap IPG based on timestamps of received messages, e.g., a difference between the timestamp of a most recently received message and a timestamp of the last message (in other words, timestamp difference between last two consecutively received messages).

The computer 280 of each of the communication nodes 250 may be programmed to transmit the determined communication metrics of the respective communication node 250 and node identification data including node 250 location data to the infrastructure element 210. Table 2 shows an example set of data that each communication node 250 may transmit to the infrastructure element 210.

TABLE 2

| Datum | Description |
|---|---|
| Infrastructure element identifier | An identifier of the infrastructure element based on which the communication metric are determined. |
| Communication node location | Location coordinates of the node, e.g., GPS coordinates |
| IPG | Inter-Packet Gap |
| RSS | Received Signal Strength |
| PER | Packet Error Rate |
| Latency | Time difference between a first time of sending to a second time of receiving the message. |

In one example, when a communication node 250 is located within an overlapping coverage area 225 of a first and a second infrastructure element 210, then the communication node 250 may transmit (i) a first set of data according to Table 2 including an identifier of the first infrastructure element 210 to the first infrastructure element 210 and (ii) a second set of data according to Table 2 including the identifier of the second infrastructure element 210 to the second infrastructure element 210. Thus, each of the infrastructure elements 210 may recognize the corresponding set of data based on the corresponding element 210 identifier included in each set of data.

In the present context, "providing coverage" for an area means transmitting messages in the respective area. Thus, "a communication node 250A providing coverage for a deficient communication node 250C" means that the communication node 250A transmits messages in the area within the field of view 260C of the communication node 250C; the messages are the messages which should have been transmitted by the deficient communication node 250C. Note that when a node 250A provides coverage for a deficient node 250C, the node 250A still covers its field of view 260A, i.e., the node 250A transmits (i) messages which should been transmitted by the nodes 250A in the field of view 260A, and (ii) messages which should have been transmitted by the node 250C in the field of view 260C.

The computer 220 may be programmed to provide coverage for the second field of view 260B by actuating an actuator 290 of the first communication node 250A to rotate the first directional antenna 285, thereby providing a third field of view including the first and second fields of view 260A, 260B. For example, the computer 220 may actuate the actuator 290 in the first communication node 250A to rotate the first directional antenna 285 to provide coverage for the first and second fields of view 260A, 260C.

The computer 220 may be programmed to determine a rotational speed v of the first directional antenna 285 of the first communication node 250A based on the first and second transmission parameters. For example, upon determining that the messages are transmitted in the fields of view 260A, 260C based on a cycle time of 100 ms, the computer 220 may actuate the node 250A actuator 290 to rotate the node 250A antenna 285 with a speed of 10 rotations per second (rotation/s). Thus, in each turn, the computer 280 of the node 250A may transmit the messages for the field of view 260A and the field of view 260C. A rotational speed v may be specified in degrees per sec (d/s). For example, a speed of 1 (one) rotation per second (1/s) is equal 360 d/s.

The computer 220 may be programmed to reduce the transmission data throughput rate R based on a maximum rotational speed v of the directional antenna 285. For example, the computer 220 may determine a maximum rotational speed $v_{max}$ for the actuator 290 based on specified maximum speed stored in a computer 220 memory and to determine the data throughput rate $R_{max}$ based at least in part on the maximum rotational speed $v_{max}$, e.g., in accordance to Equation (1). Based on Equation (1), a numerical value of a maximum data through rate $R_{max}$ specified in (Hertz) Hz is equal to the numerical value of maximum rotational speed $v_{max}$ of the actuator 290. In other words, a maximum rotational speed $v_{max}$ of the antenna 285 can determine a maximum data throughput rate $R_{max}$.

$$R_{max} = v_{max} \quad (1)$$

In one example, upon determining a node 250A data throughput rate $R_a$ of 2 Hz, a node 250C data throughput rate $R_c$ of 6, and a maximum rotational speed of 4 rotation/s (or 1440 deg/s), the computer 220 may limit the data through rate $R_c$ to 4 Hz while maintaining data throughput rate $R_a$ of 2 Hz.

As discussed above, an antenna 285 may have a viewing angle α and an axis of transmission, e.g., axis $at_1$. Thus, for transmitting messages while rotating, the computer 220 may be programmed to actuate the actuator 290 at specific angle(s) β to ensure the messages are transmitted in a respective field of view 260A, 260C. In other words, the computer 280 may be programmed to actuate a transmission of the message while rotating the antenna 285 further based on a rotational angle β of the antenna 285 (specified relative to the reference line $L_r$) and location of the fields of view 260A, 260C. The computer 280 may determine an angle of transmission β for each field of view 260A, 260C being covered (referring to the example above, in which the second communication node 250C is deficient and the node 250A provides coverage for fields of view 260A, 260C.)

The angle of transmission β, in the present context, is an angle β (or, for respective transmissions of message, a set of angles $β_1, β_2, β_3$) on the ground surface between the antenna 285 axis and the reference line $L_r$ on the ground surface passing through the location of the node 250A. With reference to the example described above, in which the node 250A provides coverage for the node 250A field of view 260A and the deficient node 250C field of view 260C, the computer 220 may be programmed to determine a set of actuation times $at_1, at_2, at_3$ for transmission of messages to cover fields of view 260A, 260C based on the angles of transmission $β_1, β_2, β_3$. The actuation times $at_1, at_2, at_3$ are based on a rotational speed v of the antenna 285 and the angles $β_1, β_2, β_3$. For example, the computer 220 may determine an actuation time $at_1$ such that an antenna 285, rotates with the speed v to angle $β_1$ at the time $at_1$ where its axis passes the line $L_r$ at time 0 (zero).

Figure 3:
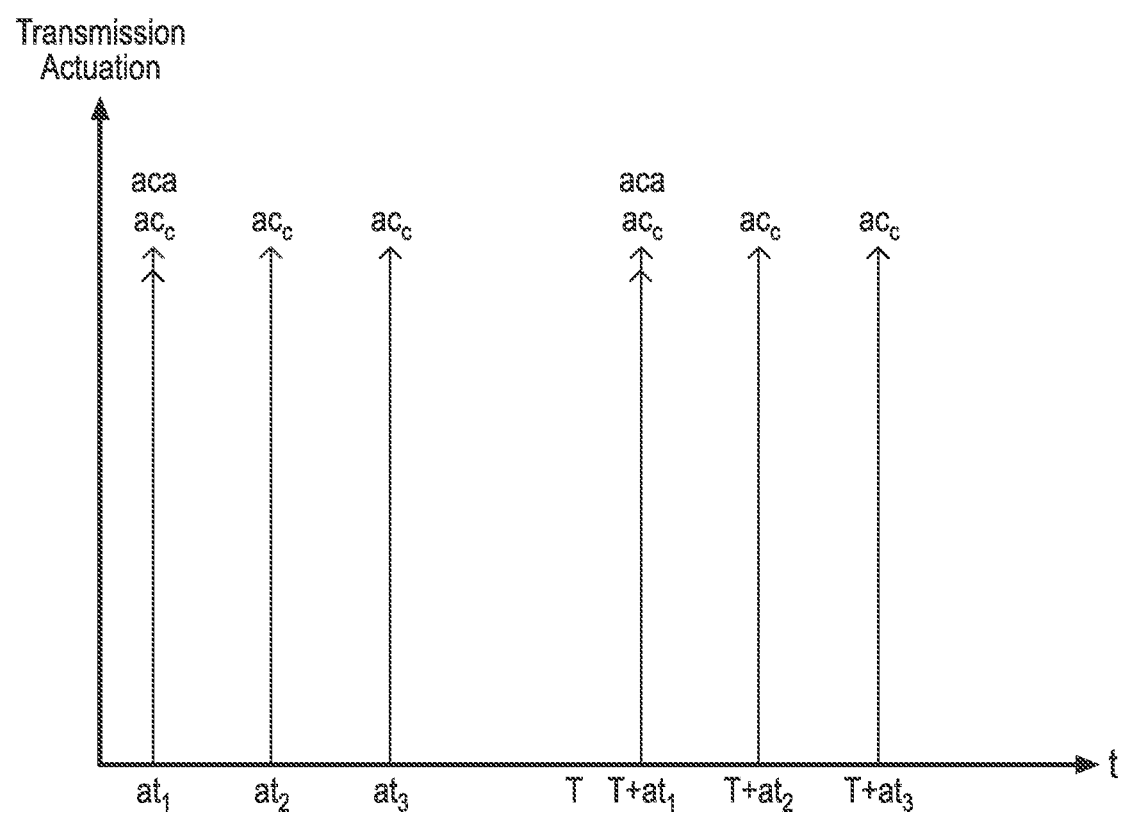
FIG. 3 is an example graph of actuation times of a rotatable communication node antenna.

A graph 300 of FIG. 3 illustrates actuations aca, ace of node 250A at actuation times $at_1, at_2, at_3$ to transmit messages from the node 250A antenna 285. With respect to the graph 300, actuation aca represents actuating the antenna 285 of the node 250A to transmit data for the field of view 260A, and the actuation acc represents actuating the antenna 285 of the node 250A to transmit data for the field of view 260C (i.e., data that is sent by node 250A due to deficiency of the node 250C). A cycle time T is determined based on a rotational speed of the antenna 285. For example, cycle time T is 100 ms when the rotational speed v is 10 rotation/sec. With reference to FIG. 2A and the graph 300 shown in FIG. 3, the computer 220 may be programmed to actuate the antenna 285 of node 250A to (i) transmit messages of the node 250A and the node 250C at the time $at_1$, and (ii) to transmit messages of the deficient node 250C at the actuation times $at_1, at_2, at_3$. The computer 220 may be programmed to determine actuation times $at_1, at_2, at_3$ for transmitting messages of deficient node 250C based on (i) the field of view 260C of the deficient node 250C, (ii) the viewing angle α of the node 250A antenna 285, (iii) location of the road 230, and (iv) the location of the node 250A which provides coverage for the deficient node 250C. By transmitting messages of the deficient node 250C at times $at_1, at_2, at_3$, the computer 220 transmits over, i.e. covers at least, the road 230 surface area within the deficient node 250C field of view 260C.

As discussed above, with respect to the example illustrated in FIG. 2A, the computer 220 may determine that the second communication node 250C is deficient based on communication metrics received from the first communication node 250A. However, the first communication node 250A could alternatively be deficient in receiving messages sent by the node 250C, which may result in a mischaracterization of the node 250C as deficient.

To prevent or reduce the possibility of such a mischaracterization, the computer 220 may be programmed to determine that the second communication node 250C is deficient based on data received from a second computer including a vehicle 100 computer 110 within the first field of view 260A, thereby determining that the first stationary communication node 250A is operational. In other words, the computer 220 determines that the first communication node 250A is operational based on determining that messages sent from other sources such as a vehicle 100 computer 110 are received by the communication node 250A, thereby concluding that a reason for not receiving messages from the node 250C is a deficiency of the node 250C. In one example, the computer 220 may determine that the first communication node 250A is operational upon determining that at least one message has been received by the respective node 250A within a specified time, e.g., a last minute, 30 seconds, etc., of operation. As discussed above, the first communication node 250A is used to determine whether a second communication node 250C is deficient. That is why, in order to prevent a false positive detection (i.e., incorrectly concluding that the second node 250C is deficient), it can be determined whether the first node 250A is itself operational.

The locations of the communication nodes 250 are determined based on road 230 locations, intersection 240 locations in the coverage area 225 of the infrastructure element 210. For example, the communication nodes 250 may be installed near (e.g., within 100 meters) intersections.

An intersection 240 may be "permissive pass" or "protected pass" or "stop and remain" With respect to an approaching vehicle 100. In the present context, "permissive pass" means vehicles 100 from different intersecting roads 230 may pass the intersection 240, e.g., blinking yellow or blinking red traffic light, stop sign, etc. "Protected pass" means a vehicle 100 has right of way at the intersection, e.g., green traffic light. "Stop and remain" means a vehicle 100 needs to stop before the intersection, e.g., red traffic light.

For a permissive pass at an intersection 240, a vehicle 100 computer 110 may need to know movement data (location, direction of movement, and/or speed) of a second vehicle 100 approaching the intersection 240 to determine whether to pass, to stop, or slow down at the intersection 240. For a protected pass, a vehicle 100 computer 110 may need to know whether a second vehicle 100 with a history of unexpected maneuvers approaches the intersection 240, e.g., a second vehicle 100 which may have passed a red light in the past, exceeded a speed limit, etc. Accordingly, the infrastructure computer 220 may adjust a payload (e.g., by adding the data to the payload) of broadcast messages to include data pertaining to a vehicle 100 with a history of unexpected maneuvers. Such data may include a present location, a present direction of movement, type of history unexpected maneuver, e.g., crossing a red light, exceeding a speed limit, etc. The computer 220 may receive such data from a remote computer, e.g., a traffic management computer. In one example, received vehicle 100 data for each vehicle 100 may include a status (that is one of: (i) a history of normal maneuvers or (ii) a history of unexpected maneuvers.

Figure 4A:
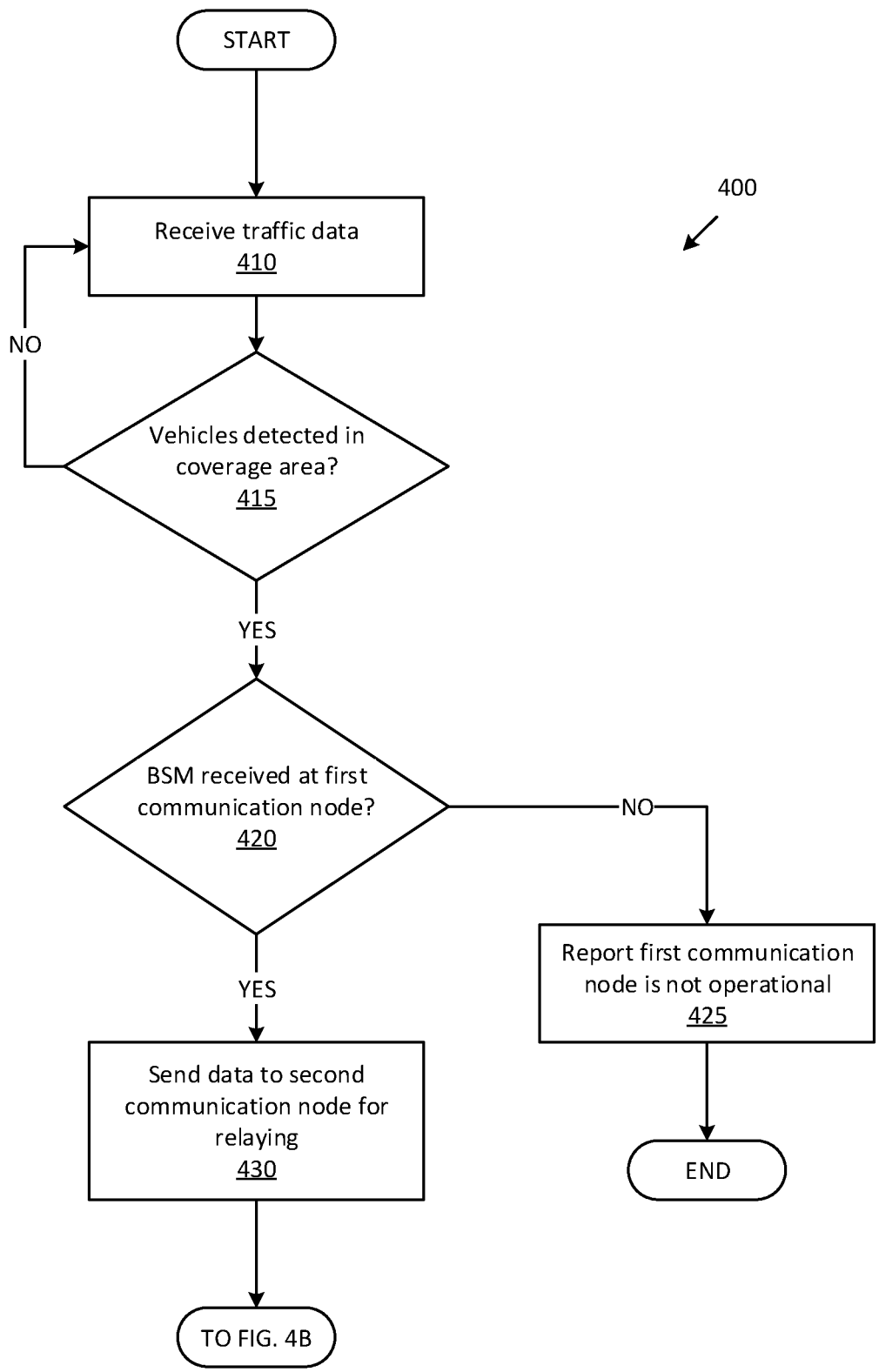

FIGS. 4A-4C show a flowchart of an exemplary process 400 for operating the infrastructure element 210. The infrastructure computer 220 may be programmed to execute blocks of the process 400. As discussed below, for at least some of the blocks of the process 400, the infrastructure computer 220 may send instructions to one or more communication nodes 250 computer 280 to perform the respective action.

With reference to FIG. 4A, the process 400 begins in a block 410, in which the infrastructure computer 220 receives data about the coverage area 225 via V2X communications, and/or from camera sensors having fields of view including at least a portion of the coverage area 225, etc. For example, the received data may include movement data, i.e., kinematic data, e.g., location, speed, and/or direction of movement, etc., of any vehicle 100 within the coverage area 225. The computer 220 may be programmed to receive data for intersection(s) 240 within the coverage area 225, e.g., whether the intersection 240 is permissive or protected, as discussed above. The computer 220 may further receive a status of traffic lights at intersections 240.

Next, in a decision block 415, the computer 220 determines whether vehicle(s) 100 are detected in the coverage area 225. The computer 220 may be programmed to determine based on the received data, e.g., V2X communications, camera data, etc., whether any vehicle 100 is located within the coverage area 225. If the computer 220 determines that at least a vehicle 100 is located within the coverage area 225, then the process 400 proceeds to a decision block 420; otherwise the process 400 returns to the decision block 415.

In the decision block 420, the computer 220 determines whether a first communication node 250A received a message, e.g., a basic safety message (BSM), from a vehicle 100. Thereby, the computer 220 determines whether the first communication node 250A is operational. If the computer 220 determines that the first node 250A is operational, then the process 400 proceeds to a block 430; otherwise the process 400 proceeds to a block 425.

In the block 425, the computer 220 reports, e.g., stores in a computer 220 memory, that the first communication node 250A is not operational. Following the block 425, the process 400 ends, or returns to the block 410, although not shown in FIG. 4A. In other words, the first node 250A cannot be selected for determining whether the node 250C is deficient. Various techniques, as discussed below, may be used to cover the field of view 260A of the first node 250A from other nodes.

In the block 430, the computer 220 sends data to a second node 250C to be relayed to the respective field of view 260C. Note, the node 250C is the node that is being tested to determine whether it is deficient. The computer 220 may be programmed actuate the second node 250C to send messages with a specified throughput rate R, e.g., 100 ms, based on the received data. In other words, data sent to the second node 250C may be an instruction to transmit messages based on the throughput rate R.

Following the block 430, with reference to FIG. 4B, in a decision block 435, the computer 220 determines whether the first node 250A received the messages from the second node 250C. The computer 220 may be programmed to determine whether the second node 250C sends the data based on the data throughput rate R. In one example, the computer 220 may determine that the second node 250C does not transmit messages when a number of not-received messages exceeds a threshold, e.g., 20. For example, with a data throughput rate R of 100 ms, the computer 220 may determine that the second node 250C does not transmit messages upon determining that no message was received from the second node 250C for 2 seconds. The computer 220 determines whether the received message at the first node 250A is from the second node 250C based on a source identifier included in the messages (Table 1). If the computer 220 determines that messages were received from the second node 250C, then the process 400 proceeds to a decision block 440; otherwise the process 400 proceeds to a block 455.

In the decision block 440, the computer 220 determines whether an inter-packet gap IPG of messages received at the first node 250A from the second node 250C exceeds a threshold, e.g., 200 ms. The computer 220 may be programmed to receive data including the inter-packet gap IPG from the node 250A computer 280. Thus, the computer 280 of the first node 250A may determine the inter-packet gap IPG of the messages received from the second node 250C based on the timestamps of the received messages. If the computer 220 determines that IPG of messages sent by the second node 250C received at the first node 250A exceeds the threshold, then the process 400 proceeds to a block 455; otherwise the process 400 proceeds to a decision block 445.

In the decision block 445, the computer 220 determines whether a latency to the messages received from the second node 250C at the first node 250A exceeds a threshold, e.g., 10 ms. A latency in this context is a time from instructing the second node 250C to send a message until the first node 250A receives the respective message. The computer 220 may be programmed to determine a latency of a message by comparing a first timestamp of sending a message from the second node 250C to a second timestamp of the message received at the first communication node 250A. If the computer 220 determines that a latency of a message sent by the second node 250C received at the first node 250A exceeds a threshold, then the process 400 proceeds to the block 455; otherwise the process 400 proceeds to a decision block 450.

In the decision block 450, the computer 220 determines whether the received signal strength RSS of messages received from the second node 25C at the first node 25A is less than a threshold, e.g., −75 dBm. If the computer 220 determines that the received signal strength RSS of received messages from the second node 250C is less than the threshold, then the process 400 proceeds to the block 455; otherwise the process 400 proceeds to a block 460 (FIG. 4C).

In the block 455, which can be reached from each of the blocks 440, 445, 450, the computer 220 actuates the first node 250A to provide coverage for the node 250A field of view 260A and the field of view 260C of the deficient node 250C. As discussed above, the computer 220 may actuate a motor actuator 290 of the first node 250A to rotate the node 250A antenna 285 to cover the fields of view 260A, 260C. The computer 220 may be programmed to determine actuation times $at_1$, $at_2$, $at_3$ of the node 250A antenna 285 as discussed with respect to FIG. 3.

Next, in a decision block 465, the computer 220 determines whether a permissive pass is detected, e.g., at the intersection 240 shown in FIG. 2A. If the computer 220 determines that the intersection 240 is a permissive pass, then the process 400 proceeds to a block 470; otherwise the process 400 proceeds to a decision block 475.

In the block 470, the computer 220 actuates a node 250 with a field of view 260 including the permissive pass to send out object data such as other vehicles 100 approaching the intersection 240. For example, upon determining that the vehicle 100 is in the field of view 260D, the computer 220 may actuate the node 250D to transmit object data of other vehicles 100 approaching the intersection 240. Following the block 470 the process 400 ends, or alternatively returns to the block 410, although not shown in FIGS. 4A-4C.

Next, in the decision block 475, the computer 220 determines whether a vehicle 100 with a history of unexpected maneuvers is detected. For example, the computer 220 may be programed to detect a vehicle 100 with a history of unexpected maneuver based on data received from a remote computer identifying vehicles with unexpected maneuver history and location data of the vehicles 100 broadcast via the V2X communications. If the computer 220 detects a vehicle 100 with a history of unexpected maneuver, then the process 400 proceeds to a block 480; otherwise the process 400 ends, or alternatively, returns to the block 410, although not shown in FIGS. 4A-4C.

In the block 480, the computer 220 broadcast the location of vehicle(s) with a history of unexpected maneuvers. In one example, the computer 220 may be programmed to identify the fields of view 260 including location of the vehicle(s) with a history of unexpected maneuver and actuate the nodes 250 of respective identified fields of view 260. Following the block 480, the process 400 ends, or alternatively, returns to the block 410, although not shown in FIGS. 4A-4C.

FIG. 5 is a flowchart of an exemplary process 500 for operating a communication node 250. A communication node 250 computer 280 may be programmed to execute blocks of the process 500.

The process 500 begins in a decision block 510, in which the computer 280 determines whether a message is received from the infrastructure element 210 to relaying. A message may be received via a wired or wireless communication network. If the computer 280 determines that a message for relaying is received, then the process 500 proceeds to a block 520; otherwise the process 500 proceeds to a decision block 530.

In the block 520, the computer 280 relays the received message via the V2X communications to the node 250 field of view 260. The message may be sent based on received data including data throughput rate R, power P, etc. Following the block 520, the process 500 proceeds to the decision block 530.

In the decision block 530, the computer 280 determines whether a message is received from a second node 250C, a vehicle 100, etc. If the computer 280 determines that a message from a second node 250C, a vehicle 100, etc. is received, then the process 500 proceeds to a block 540; otherwise the process 500 proceeds to a block 540; otherwise the process 500 proceeds to a decision block 550.

In the block 540, the computer 280 determines the communication metrics (see Table 1) based on the received messages and sends the determined communication metrics to the infrastructure element 210. For example, the computer 280 may be programmed to determine the communication metrics of the second node 250C including inter-packet gap IPG, latency, etc.

In the decision block 550, the computer 280 determines whether an instruction for providing coverage to, e.g., the second node 250C, is received. If the computer 280 determines that an instruction to provide coverage is received then the process 500 proceeds to a block 560; otherwise the process 500 ends, or alternatively returns to the decision block 510, although not shown in FIG. 5.

In the block 560, the computer 280 actuates the actuator 290 to rotate the antenna 285 based on the received instruction to provide coverage to own field of view, e.g., the field of view 260A, and the field of view 260 of a second node, e.g., the field of view 260C. The computer 280 may be programmed to actuate the antenna 285 at, e.g., actuation times $at_1$, $at_2$, $at_3$, to transmit the messages to the fields of view 260A, 260C, as discussed above with reference to FIGS. 2A and 3. Following the block 560, the process 500 ends, or alternatively returns to the decision block 510, although not shown in FIG. 5.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising an infrastructure element including a computer programmed to:
   communicate with a first stationary communication node having a first directional short-wave antenna with a first field of view and a second stationary communication node having a second directional short-wave antenna with a second field of view, wherein the first communication node is located within the second field of view;
   determine a first transmission parameter for the first stationary communication node and a second transmission parameter for the second stationary communication node based on received object detection sensor data including object data from a respective field of view of each communication node's directional antenna, wherein each of the first and second transmission parameters includes at least one of a transmission power or a data throughput rate;
   based on received communication metrics from the first communication node, determine a deficiency of the second communication node; and
   upon determining the deficiency of the second communication node, actuate the first communication node to provide coverage for the second field of view.

2. The system of claim 1, wherein the computer is further programmed to provide coverage for the second field of view by actuating an actuator of the first communication node to rotate the first directional antenna, thereby providing a third field of view including the first and second fields of view.

3. The system of claim 2, wherein the computer is further programmed to determine a rotational speed of the first directional antenna based on the first and second transmission parameters.

4. The system of claim 2, wherein the computer is further programmed to reduce the transmission data throughput rate based on a rotational speed of the first directional antenna.

5. The system of claim 1, wherein the computer is further programmed to adjust the first transmission parameter based on a traffic density within the first field of view.

6. The system of claim 1, wherein the computer is further programmed to adjust the first transmission parameter based on a status of a traffic light within the first field of view.

7. The system of claim 1, wherein the computer is further programmed to determine that the second communication node is deficient based on data received from a second computer including a vehicle computer within the first field of view, thereby determining that the first stationary communication node is operational.

8. The system of claim 1, wherein the computer is further programmed to determine that the second communication node is deficient by:
   transmitting data from the computer to the second stationary communication node for transmitting within the second field of view;
   receiving the communication metrics from the first stationary communication node including whether the transmitted data was received at the first communication node; and
   then determining that the second communication node is deficient based on the received communication metrics.

9. The system of claim 1, wherein the computer is further programmed to:
   determine one or more actuation times for transmitting messages of the deficient second communication node from the first stationary communication node based on (i) a field of view of the second communication node, (ii) a viewing angle of an antenna of the first communication node, (iii) a location of the road, (iv) a rotational speed of the antenna of the first stationary communication antenna, and (v) a location of the first stationary communication node; and
   actuate the first stationary communication node to transmit messages of the second stationary communication node at the determined one or more actuation times.

10. A method, comprising:
   communicating with a first stationary communication node having a first directional short-wave antenna with a first field of view and a second stationary communication node having a second directional short-wave antenna with a second field of view, wherein the first communication node is located within the second field of view;
   determining a first transmission parameter for the first stationary communication node and a second transmission parameter for the second stationary communication node based on received object detection sensor data including object data from a respective field of view of each communication node's directional antenna, wherein each of the first and second transmission parameters includes at least one of a transmission power or a data throughput rate;
   based on received communication metrics from the first communication node, determining a deficiency of the second communication node; and
   upon determining the deficiency of the second communication node, actuating the first communication node to provide coverage for the second field of view.

11. The method of claim 10, further comprising providing coverage for the second field of view by actuating an actuator of the first communication node to rotate the first directional antenna, thereby providing a third field of view including the first and second fields of view.

12. The method of claim 11, further comprising determining a rotational speed of the first directional antenna based on the first and second transmission parameters.

13. The method of claim 11, further comprising reducing the transmission data throughput rate based on a rotational speed of the first directional antenna.

14. The method of claim 10, further comprising adjusting the first transmission parameter based on a traffic density within the first field of view.

15. The method of claim 10, further comprising adjusting the first transmission parameter based on a status of a traffic light within the first field of view.

16. The method of claim 10, further comprising determining that the second communication node is deficient based on data received from a second computer including a vehicle computer within the first field of view, thereby determining that the first stationary communication node is operational.

17. The method of claim 10, further comprising determining that the second communication node is deficient by:
   transmitting data from the computer to the second stationary communication node for transmitting within the second field of view;
   receiving the communication metrics from the first stationary communication node including whether the transmitted data was received at the first communication node; and
   then determining that the second communication node is deficient based on the received communication metrics.

18. The method of claim 10, further comprising:
   determining one or more actuation times for transmitting messages of the deficient second communication node from the first stationary communication node based on (i) a field of view of the second communication node, (ii) a viewing angle of an antenna of the first communication node, (iii) a location of the road, (iv) a rotational speed of the antenna of the first stationary communication antenna, and (v) a location of the first stationary communication node; and
   actuating the first stationary communication node to transmit messages of the second stationary communication node at the determined one or more actuation times.

* * * * *